INVENTOR.
GERHARD J. K. FISCHER
BY
Meyer, Tilberry & Body
ATTORNEYS.

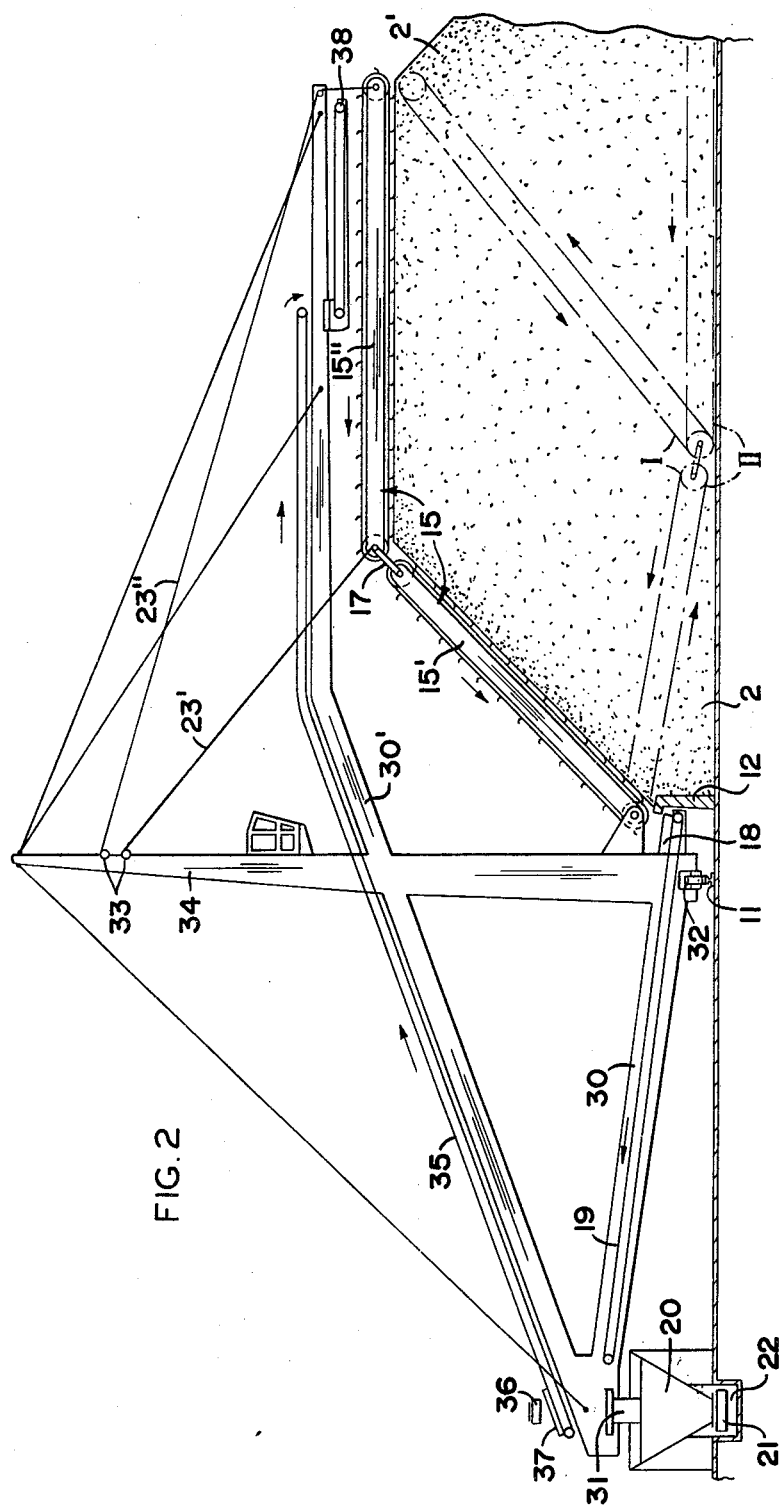

United States Patent Office 3,509,985
Patented May 5, 1970

3,509,985
CONVEYOR LOADING AND UNLOADING
APPARATUS
Gerhard Julius Konrad Fischer, Dortmund-Kirchhoerde,
Germany, assignor to Gustav Schade Maschinenfabrik,
Dortmund, Germany
Filed Mar. 15, 1968, Ser. No. 713,535
Claims priority, application Germany, Mar. 25, 1967,
M 73,335
Int. Cl. B65g 65/28
U.S. Cl. 198—36                    4 Claims

ABSTRACT OF THE DISCLOSURE

Loading and unloading apparatus in which a conveyor loader pivots about a central axis to distribute material circumferentially around the axis, including an articulated conveyor also pivotable about said axis arranged to pick-up the material and to discharge said material also at said central axis.

---

Figure 1:
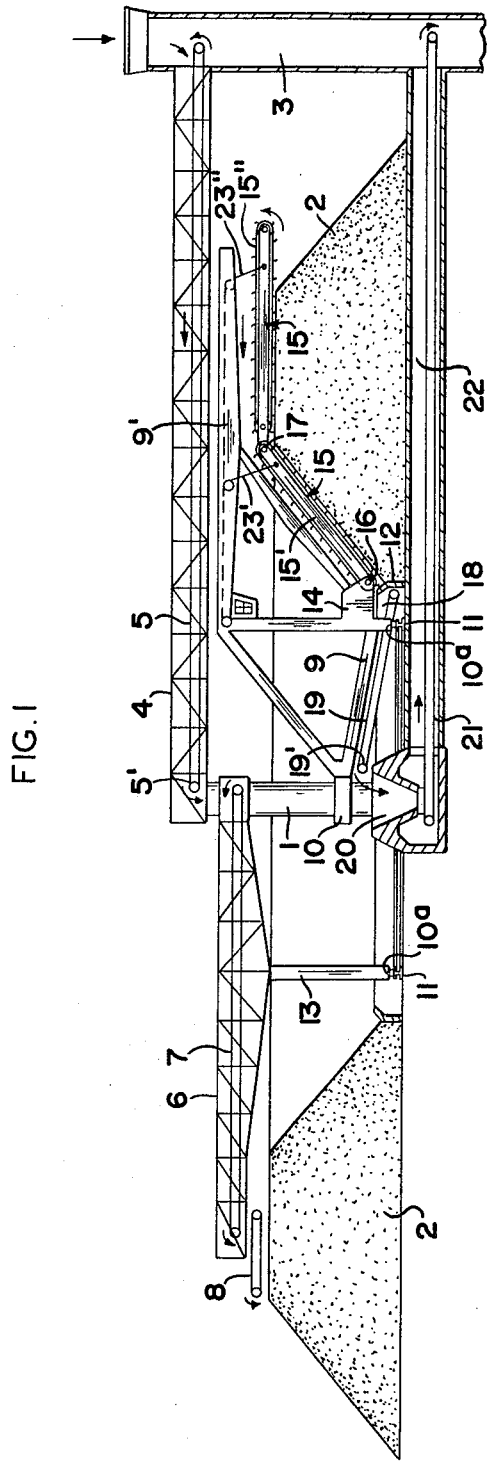

This invention relates to apparatus for loading and unloading bulk material from storage yards. In particular it relates to the loading and unloading of annular heaps of material where the loading and unloading apparatus is situated in the centre of such an annulus.

For unloading bulk materials such as coal, ores or fertilizers from heaps, it is customary to use scraper conveyors as well as excavators, grab cranes, shovel loaders and other apparatus. Scraper conveyors in addition to the advantage of continuous operation have inter alia the advantages that the scraper arm can cover a large working area, and that it can be used to mix various kinds of bulk material lying in layers one above the other in addition to discharging or unloading material from the heap. Also, even solidly caked stored materials can be picked up and discharged without difficulty with scraper conveyors. It is possible to discharge material from the heap in such a manner that at the outer side fo the bulk material heap there remains a mound approximately triangular in cross-section which forms a protection against dust nuisance in the region outside the bulk material heap. This mound need only be discharged when there are peak demands on material.

According to the present invention there is provided scraper loader apparatus for dumping or loading and discharging or unloading bulk material to and from an annular storage heap of said material, said apparatus having a scraper conveyor unloading means rotatable about a vertical axis at the centre of the annulus, and material dumping or loading means also rotatable about said axis. The scraper conveyor is preferably mounted on a scraper jib supported by a supporting frame rotatable about a vertical pivot at the centre of said annular heap of material, said jib comprising a first part which has opposite end portions pivotally attached at one end portion about a horizontal axis to said frame and a second part also having opposite end portions pivotally attached at one of its end portions about a horizontal axis to the remaining end portion of said first jib part, there being provided means for raising and lowering said jib parts either jointly or individually.

The material dumping means preferably includes a belt conveyor extending radially from the centre of said annulus.

In a preferred construction, the supporting frame which can be rotated about the central vertical axis comprises a cantilever girder projecting radially over the bulk material heap, and from which the scraper jib is suspended. According to a further feature of the invention there can be arranged on the supporting frame for the scraper jib, preferably the radial cantilever girder, the dumping conveyor belt whose charging station is at the centre of the annular heap. In this case the supporting frame serves both to support the scraper jib or jibs and also to support the dumping conveyor belt, as well as for supporting a conveyor belt for removing material discharged from the scraper jib.

Two embodiments of this invention, given by way of example only, will now be particularly described with reference to the accompanying drawings, wherein:

FIGURE 1 is a diagrammatic side view of a scraper loader for a circular storage yard; and, FIGURE 2, is also a side view, showing a second embodiment of a scraper loader.

In the two figures, like reference numerals indicate similar features of the two embodiments.

The scraper loader shown in FIGURE 1 comprises a stationary central column 1 which is erected at the center point of a circular storage yard. The numeral 2 designates an annular heap of bulk material, which may be by way of example a heap of coal spaced circumferentially around the column 1, and which has a trapezoidal cross-section as shown.

From a corner station 3, outside the annulus of the bulk material heap 2, there extends a feed handling conveyor bridge 4; including a conveyor belt 5, over the heap to the upper portion of the column 1 standing at the centre of the annulus, for the purpose of loading the heap. The belt 5 discharges bulk material at the reversal pulley 5' into the central column 1, the latter being hollow at the upper portion thereof. On the central column below the conveyor bridge there is mounted a material dumping or loading means 6, rotatable in a horizontal plane about the central column, and which has a dumping conveyor belt 7 and also a following distributor conveyor belt 8, mounted on the dumping means below the belt 7 so as to be pivotable in a horizontal plane and/or displaceable in its longitudinal direction. When dumping on the heap, the coal arriving from the feed conveyor belt 5 is passed to the dumping conveyor belt 7 through the column 1 and is then discharged from the distributor belt 8 on to the bulk material heap 2. The dumping means including the dumping conveyor belt 7 are so pivoted or moved during dumping that the scraper loader can subsequently discharge the stored coal in a satisfactorily mixed form.

The unloading or discharge part of the scraper loader has a supporting frame 9 which is mounted by means of, for example, a bearing ring 10 below the dumping apparatus on the central column 1, so as to be rotatable in a horizontal plane about the central column. The supporting frame 9 is provided with a cantilever girder 9' projecting radially over the bulk material heap 2. It also comprises running gear 10a whose wheels, driven by a running gear motor (not shown), run on an annular rail 11 which is circumferentially disposed about the central column 1, adjacent a boundary wall 12 situated in the storage yard at the foot of the inner slope of the heap of bulk material. By means of the running gear, therefore, the entire supporting frame 9 with the scraper jib (to be described) can be rotated about the vertical central column 1.

At the same time the dumping apparatus 6 is supported on the annular rail 11 by means of a support column 13 which has running gear at its lower end enabling the dumping apparatus to be rotated about the vertical axis of the central column. On a bracket 14, provided on the frame 9 above the running gear 10a, there is pivotally mounted on a horizontal pivot 16 a scraper jib 15 which comprises two articulated jib parts 15' and 15" respectively which are connected to one another by a horizontal pivot 17. The scraper jib parts are of conventional construction.

They comprise, on circulating endless chains, scraper elements which, as they move along the lower run of the jib, engage the bulk material at the inner slope and at the top of the heap and gradually remove material from the heap.

The two jib parts 15' and 15" are each suspended by means of independent lifting gear 23' and 23" respectively from the cantilever girder 9' of the supporting frame. Thus the two jib parts can be pivoted in a vertical plane either jointly or individually in the course of operation.

The material entrained by the scraper elements is scraped over the inwardly sloping upper portion of the boundary wall 12 into a hopper 18 arranged above a conveyor belt 19. The hopper 18 and belt 19 are mounted on the supporting frame 9 and are rotatable therewith about the vertical central column. The discharge end 19' of the conveyor belt 19 is situated above a delivery hopper 20 which is arranged in the middle of the storage yard and by means of which the material is fed to a discharge conveyor belt 21 which is situated in a duct 22 extending radially outwards from the middle of the storage yard below the surface level of the yard. During discharge, the supporting frame 9 with the scraper jib 15 is usually rotated about the vertical central column so that the coal is discharged from the heap uniformly around the annulus. Using this embodiment of scraper loader it is possible to dump material in one part of the heap by means of the dumping apparatus 6 and simultaneously remove material from another part using the scraper jib. It is also possible to control the entire operation of the apparatus automatically in accordance with a pre-determined program.

In the embodiment illustrated in FIGURE 2 the supporting frame 30 is also adapted to be rotated about a pivot 31 in the center of a circular storage yard or an annularly piled heap 2 of bulk material. Here again, the supporting frame is provided with running gear 32 radially spaced from the vertical central pivot. The running gear has driven wheels running on annular rail 11, which is situated adjacent the boundary wall 12 at the foot of the inner slope of the bulk material heap. During unloading, material discharged by the scraper jib 15 is fed through the hopper 18 onto the conveyor belt 19 which conveys the bulk material into the delivery hopper 20 arranged centrally above the discharge belt 21.

As in the previously described embodiment, the two jib parts 15' and 15" of the scraper jib are pivotally connected to one another at 17 and may be raised and lowered individually or jointly by means of the lifting gear 23' and 23". This gear comprises tackle extending over pulleys 33 on a mast 34, so that the jib parts during dumping can, if desired, be brought into the positions designated in broken lines as I and II respectively, and also into appropriate intermediate positions. In positions I a mound 2' of bulk material of approximately triangular cross-section is left standing at the outer side of the heap to form a wind shield.

The significant aspect of this embodiment is that the supporting frame for scraper jibs is also used for supporting the loading or dumping conveyor belt. Connected to the supporting frame 30 is a cantilever girder 30' which extends radially over the heap 2, and on which a dumping belt 35 is mounted. Bulk material is fed to the dumping belt 35 from a feed belt 36 by way of a hopper 37 positioned over the central pivot axis of the scraper loader, and is discharged onto the heap by way of a pivotable and/or longitudinally displaceable distributor belt 38. Thus this scraper loader can be used at the same time for dumping bulk material on the heap and discharging bulk material from the same heap, the dumping belt being arranged here on the supporting frame of the scraper jib.

It is to be understood that these specific embodiments are given by way of example only, and it will be evident that many alternative arrangements and constructional features are possible without departing from the scope of the invention, as defined in the following claims.

Having thus described my invention, I claim:

1. Apparatus for unloading bulk material from an annular storage heap of said material, comprising an annular track means circumferentially disposed around the center of the storage heap adjacent the inner foot of the heap;
a scraper loader including a scraper jib means;
a supporting frame means pivotably supporting the scraper jib means so that the latter extends across the storage heap and is movable in a vertical plane, the pivot point between the frame means and scraper jib means also being adjacent the inner foot of the storage heap;
pivot means centrally disposed within the storage heap connected with said supporting frame means and defining a vertical axis for rotation of the frame means and scraper jib means thereabout;
running gear means arranged on said frame means for circumferential movement on the annular track means;
conveyor belt means supported by the frame means to rotate therewith about said vertical axis; said conveyor belt means having a receiving end and a discharge end, said receiving end being arranged adjacent the pivot point between the frame means and the scraper jib means so that material removed from the storage heap by the scraper jib means is transferred to the conveyor belt means;
said discharge end of the conveyor belt means being arranged adjacent the pivot means so that material can be discharged therefrom for further conveying;
said supporting frame means comprising a cantilever girder extending radially over the storage heap and from which the scraper jib means is suspended; and loading means rotatable about the pivot means, a feed station adjacent the pivot means, said loading means comprising a dumping conveyor means to convey material from the feed station and to discharge the material onto the heap.

2. Apparatus according to claim 1 wherein said dumping conveyor means includes a dumping belt conveyor extending radially from the feed station over the storage heap.

3. Apparatus according to claim 2 wherein said dumping conveyor means is mounted on said cantilever girder.

4. Apparatus according to claim 2 including an additional frame means rotatable about said pivot means supporting said dumping conveyor means independently of said first-mentioned frame means.

References Cited

UNITED STATES PATENTS

| 3,184,038 | 5/1965 | Petchuk | 198—97 |
| 3,308,972 | 3/1967 | Jensen | 214—10 |
| 2,423,279 | 7/1947 | Wren | 214—10 |
| 3,334,759 | 8/1967 | Ludwig | 214—10 |

FOREIGN PATENTS

| 267,639 | 9/1963 | Australia. |
| 615,973 | 7/1935 | Germany. |
| 1,229,913 | 12/1966 | Germany. |
| 762,278 | 11/1956 | Great Britain. |
| 648,720 | 11/1962 | Italy. |

GERALD M. FORLENZA, Primary Examiner

F. E. WERNER, Assistant Examiner

U.S. Cl. X.R.

214—10

UNITED STATES PATENT OFFICE
CERTIFICATE OF CORRECTION

Patent No. 3,509,985          Dated May 5, 1970

Inventor(x) Gerhard Julius Konrad Fischer

It is certified that error appears in the above-identified patent and that said Letters Patent are hereby corrected as shown below:

In figures 1 and 2 of the drawing, the unreferenced arrows which indicate the direction of movement of the endless movable scrapers on scraper jib 15 (defined by scraper jib parts 15' and 15") should point in the opposite direction.

Signed and sealed this 12th day of October 1971.

(SEAL)
Attest:

EDWARD M. FLETCHER, JR.          ROBERT GOTTSCHALK
Attesting Officer                   Acting Commissioner of Patents